US011468915B2

(12) United States Patent
van Welzen et al.

(10) Patent No.: US 11,468,915 B2
(45) Date of Patent: Oct. 11, 2022

(54) AUTOMATIC VIDEO MONTAGE GENERATION

(71) Applicant: NVIDIA Corporation, Santa Clara, CA (US)

(72) Inventors: James van Welzen, Sandy, UT (US); Jonathan White, Fort Collins, CO (US); David Clark, Cary, NC (US); Glenn Cochran, Campbell, CA (US); Amit Parikh, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/060,878

(22) Filed: Oct. 1, 2020

(65) Prior Publication Data

US 2022/0108727 A1   Apr. 7, 2022

(51) Int. Cl.
*G11B 27/036*   (2006.01)
*G06T 11/60*    (2006.01)
*G11B 27/10*    (2006.01)
*G06V 20/40*    (2022.01)

(52) U.S. Cl.
CPC ............ *G11B 27/036* (2013.01); *G06T 11/60* (2013.01); *G06V 20/41* (2022.01); *G11B 27/10* (2013.01); *G06V 20/44* (2022.01)

(58) Field of Classification Search
CPC ... G11B 27/19; G06F 16/7844; G06F 16/735; G06K 9/00718; G06K 9/00765; G06K 2209/01
USPC ........................................................ 386/290
See application file for complete search history.

(56) References Cited

U.S. PATENT DOCUMENTS

| | | | |
|---|---|---|---|
| 2003/0222994 A1* | 12/2003 | Dawson | H04N 21/4307 348/247 |
| 2005/0140695 A1* | 6/2005 | Dunton | H04N 7/08 345/629 |
| 2013/0315568 A1* | 11/2013 | Boyd | G06F 40/106 386/282 |
| 2015/0147045 A1* | 5/2015 | Birnkrant | G06K 9/00751 386/241 |
| 2016/0358629 A1* | 12/2016 | Pribula | H04N 21/43615 |
| 2017/0078169 A1* | 3/2017 | Bent | H04L 43/02 |
| 2018/0343482 A1* | 11/2018 | Loheide | H04N 21/26208 |

* cited by examiner

*Primary Examiner* — Thai Q Tran
*Assistant Examiner* — Nienru Yang
(74) *Attorney, Agent, or Firm* — Taylor English Duma LLP

(57) ABSTRACT

In various examples, users may access a tool that automatically generates video montages from video clips of the user's gameplay according to parameterized recipes. As a result, a user may select—or allow the system to select—clips corresponding to gameplay of the user and customize one or more parameters (e.g., transitions, music, audio, graphics, etc.) of a recipe, and a video montage may be generated automatically according to a montage script output using the recipe. As such, a user may have a video montage generated with little user involvement, and without requiring any skill or expertise in video editing software. In addition, even for experienced video editors, automatic video montage generation may be a useful alternative to save the time and effort of manually curating video montages.

20 Claims, 7 Drawing Sheets

AUTOMATIC VIDEO MONTAGE GENERATION

BACKGROUND

Creating rich, interesting videos is a popular activity and a burgeoning career choice for many users on content provider platforms. Often, these videos may apply video production techniques such as stitching shorter, non-contiguous video segments ("video clips"), together in the same video sequence. A collection of such clips, typically sharing the same theme or general subject matter is also known as a video montage. Subject matter areas that are particularly popular include highlights from sporting events, and gameplay from video games. In one popular example, users may stitch together various video clips from gameplay, and may include textual overlays, animations, background music, transitions, and/or other effects or features—typically sourced and produced using manual effort—to make the montages more creative, humorous, and unique. Once created by users, the users may share the montages with others in order to highlight their successes or achievements within a particular game or type of game.

However, creating these video montages is a laborious task that not only requires some level of video editing skills, but also requires the purchase or acquisition of licenses to potentially expensive video editing tools. For example, selecting videos, cropping videos to highlight noteworthy sections of gameplay, creating contextual graphics, placing the contextual graphics at various portions of the montage, addition transition effects, inserting music or audio effects, and/or other tasks of video montage creation require training, practice, and experience in order to execute effectively. Even where a user may have the requisite skill for video editing and montage generation, the process of generating the video montage using video editing tools is time-consuming. As a result, many users—although having a desire to generate montages to showcase their gameplay—do not create their own video montages or create video montages of limited quality due to the burden and time requirements to do so.

SUMMARY

Embodiments of the present disclosure relate to automatic video montage generation. Systems and methods are disclosed that allow users to access a tool that automatically generates video montages from video clips of a user's gameplay according to parameterized guidelines or "recipes"—e.g., executable code that uses video data and various parameters to generate a montage script. As a result, a user may select—or allow the system to select—clips corresponding to gameplay of a user and customize one or more parameters (e.g., transitions, music, audio, graphics, etc.) of the recipe, and a video montage may be generated automatically according to the montage script and the recipe.

In contrast to conventional systems, such as those described above, a user does not have to have a license to or familiarity with video editing software tools in order to generate a video montage of their gameplay. For example, various montage creation recipes may be used to take one or more input videos, graphics, transitions, audio, and/or other data or parameter selections and generate a video montage. In some embodiments, a transcoder may use the montage script—generated by executing the recipe—that defines a timeline including video clips and data corresponding to graphics overlays, audio, etc. to generate each frame of the video montage according to the timeline. As such, for each montage frame, a frame from a video clip and/or a graphics overlay frame may be used—or composited—until the entirety of the video montage is rendered. The graphics overlay frame may, in some embodiments, be generated using an embedded browser that renders the graphics—such as scalable vector graphics (SVG) or cascading style sheets (CSS)—from a graphics or animation library. The graphics overlay frame may be encoded using a red green blue alpha (RGBA) color model such that alpha compositing may be used by the transcoder to generate a composite frame corresponding to the frame from the video clip and the graphics overlay frame. As a result, a user may have a video montage generated with little user effort, and without requiring any skill or expertise in video editing software. In addition, even for experienced video editors, automatic video montage generation may be a useful alternative to save the time and effort of manually curating video montages.

BRIEF DESCRIPTION OF THE DRAWINGS

The present systems and methods for automatic video montage generation are described in detail below with reference to the attached drawing figures, wherein.

DETAILED DESCRIPTION

Figure 1:
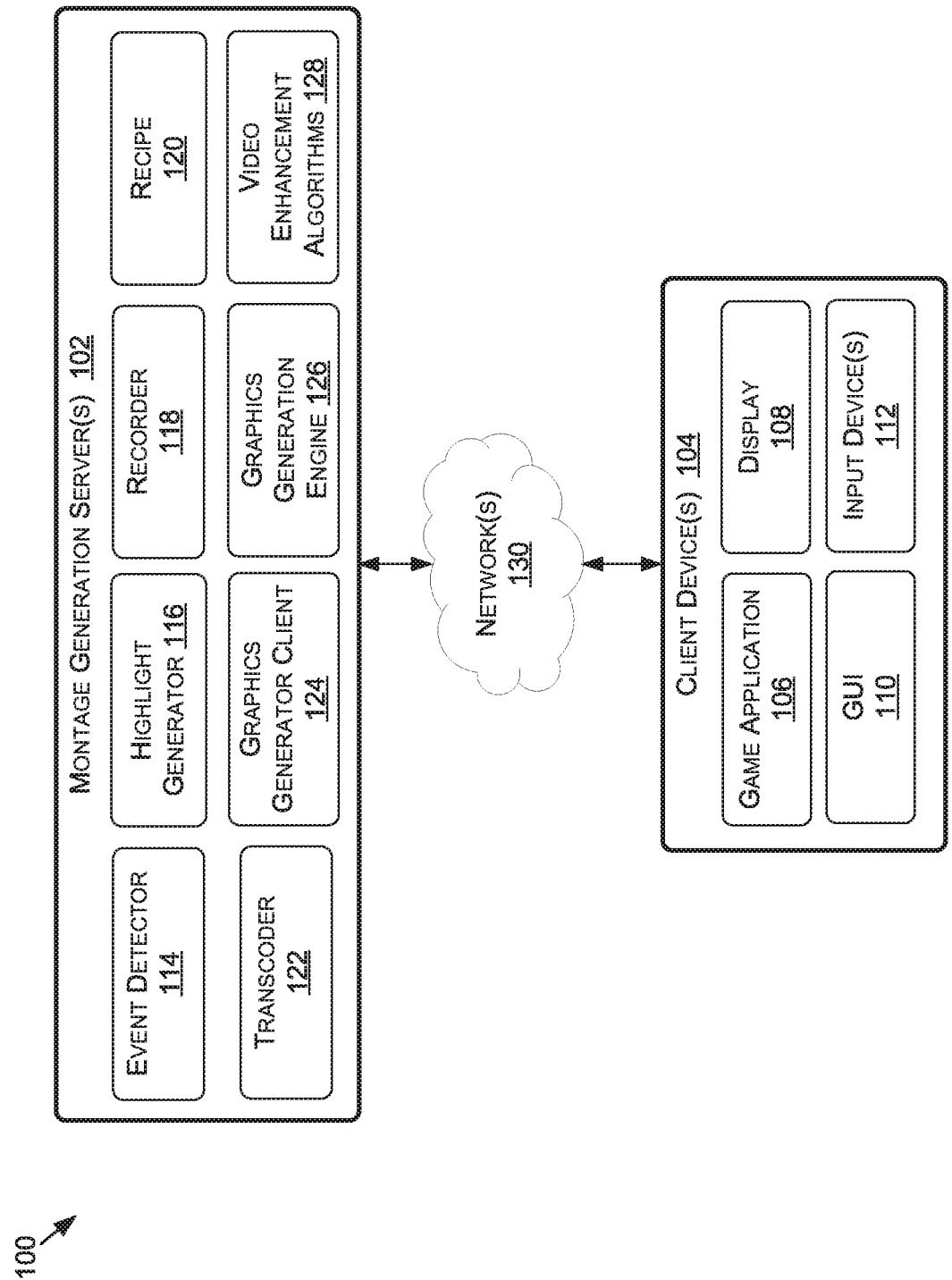
FIG. 1 depicts an example block diagram of a video montage generation system, in accordance with embodiments of the present disclosure.

Systems and methods are disclosed related to automatic video montage generation. Although primarily described herein with respect to gaming implementations, this is not intended to be limiting. For example, the systems and methods of the present disclosure may be implemented for any application of automatic video curation—such as in simulation applications, virtual reality (VR), augmented reality (AR), and/or mixed reality (MR) applications, content editing applications, social media applications, and/or the like. As such, the automatic video montage generation system described herein may be useful for curating video clips generated from any source(s) and within any number of different applications.

In some embodiments, a webpage may correspond to a recipe for video montage generation, or a separate application may execute the video montage generation. The recipe may be configured such that, when executed, one or more input videos and event metadata corresponding to the input video (e.g., event logs corresponding to events of particular types—such as kills or deaths in first person shooter (FPS) style games, or goals, home runs, touchdowns, or other scoring plays in sports style games) may be used to generate a video montage script. For example, the recipe may include browser executable code, in embodiments, that may both mine the event metadata for events usable in the recipe but also to draw foreground graphics for the output—e.g., composite—video. In some embodiments, in addition to or alternatively from mining for events, a user may select videos or video clips therefrom that the user would like included in the video montage. In any example, the recipe may draw or select certain graphics, effects, transitions, text, and/or other information that corresponds to the events and/or the video clips used for the video montage script.

As such, when the embedded browser runs the webpage or recipe, or when the application executes (e.g., where an embedded browser is not used), a first pass may create instructions in the form of a montage script for a transcoder to stitch together clips from the input videos—e.g., by parsing the event logs. For example, the montage script may define a timeline corresponding not only to the video clips, but also to transition frames, graphic overlays, audio, and/or other components of the video montage. A second pass through the recipe may enable communication, frame by frame, between the graphics generation engine—such as a two-dimensional (2D) vector graphics generation engine—and the transcoder to render graphical overlay frames including graphical elements, transitions, effects, and/or the like and video frames from video clips that correspond to each time step from the timeline of the video montage. As such, where a graphical overlay frame is to be composited with a video frame from an input clip, the transcoder may generate the corresponding frame for the video montage based on the compositing. Where a graphical overlay frame is not included at a time step (e.g., includes fully transparent values for each pixel), the final frame may correspond to the video frame from the input clip alone. Similarly, where a video frame from an input clip is not included at a particular time step, the final frame may correspond only to a graphical overlay frame (e.g., where a red green blue alpha (RGBA) format is used for the graphical overlay frames, the alpha value may be set for no transparency).

In embodiments where an embedded browser is used to generate the graphical overlay frames, the rendering may be adapted to run as fast as possible (e.g., faster than in real-time). As a result, instead of rendering at a frame rate of a video (e.g., 30 frames per second (fps), 60 fps, etc.), the rendering rate of the browser may be increased (e.g., to 100 fps, 150 fps, 200 fps, or faster) because the transcoder generating the composite frames can execute at this rate. In addition, where the rendering clock may traditionally advance according to wall clock time (e.g., advance one frame every 1/30th of a second for 30 fps rendering), the browser rendering of the present system may advance per frame at a pace set or managed by the graphics generation engine based on execution capabilities of the transcoder (e.g., where transcoder can execute at 200 fps, the browser rendering of the graphical overlay frame may also execute at this rate). As such, the browser rendering may proceed in lockstep frame by frame with the transcoder—e.g., different from traditional browser rendering that immediately advances to a next frame without regard for another component or process.

In addition to the video frames and the graphical overlay frames, one or more effects may be applied to the video frames, the graphical overlay frames, and/or the composited frames generated therefrom. For example, shader effects may be applied to frames, transitions may be applied to frames using the graphics generation engine (e.g., the embedded browser renderer) or the transcoder (e.g., where the transition is a slide transition from one frame of a video clip to another). In some embodiments, upscaling may be executed where a resolution of the video montage is to be greater than resolution of one or more of the video clips. For example, artificial intelligence, machine learning, and/or other techniques may be used to effectively upscale the frames from a captured resolution to a resolution that matches the video montage resolution (e.g., upscaled from 720p to 1080p). Further, in some embodiments, picture-in-picture of nested windows may be used to generate composite video frames using the transcoder, where a video frame may correspond to a first video clip and a second PIP video clip. The composite video frame may then have graphical overlays applied thereto, transitions, effects, and/or other features.

As a result, a user may be able to access a webpage, an in-game overlay, and/or a discrete application to generate a video montage from video clips of their own gameplay. The user may specify particular video clips, or the video clips may be mined automatically, and/or the user may specify particular user preferences for transitions, effects, themes, styles, audio (e.g., sounds or music), text, etc., and these user preferences may be used to select a recipe and/or update parameters of a recipe. The recipe may then be used to generate the montage script, which may be executed using the transcoder, and the recipe may further be used by the graphics generation engine (e.g., an embedded browser renderer) to generate graphical overlay frames corresponding to the video montage. The video frames retrieved by the transcoder and the graphical overlay frames may be composited to generate final frames for the video montage. As such, the video montage may be generated with very minimal user effort, and without requiring extensive knowledge of video curation or editing tools. The user, in some embodiments, may have the video montage generated automatically for a game the user is currently participating in, or that the user just participated in—thereby significantly decreasing the amount of time from gameplay to video montage creation as compared to conventional processes.

With reference to FIG. 1, FIG. 1 is an example video montage generation system 100 (alternatively referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Figure 5:
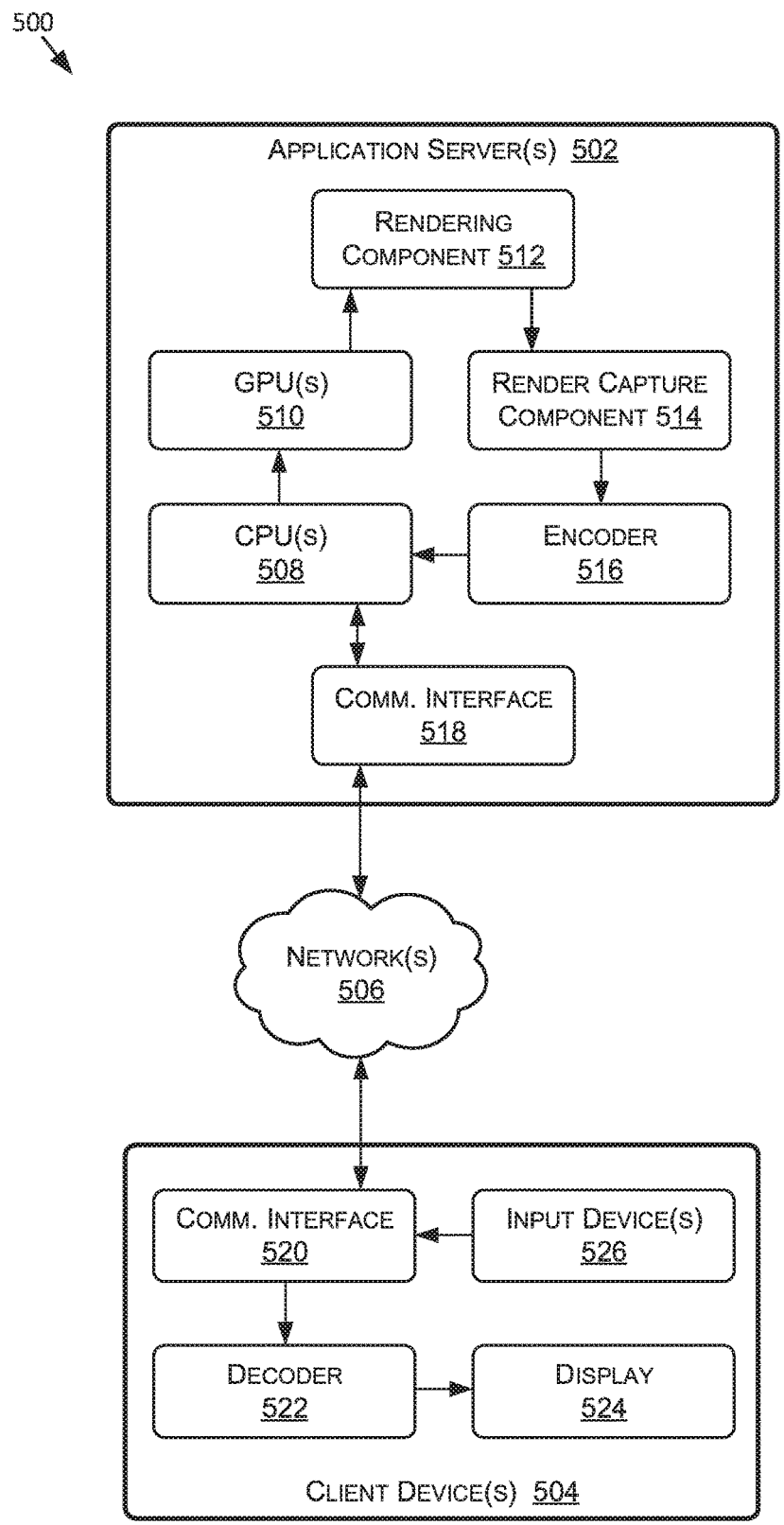
FIG. 5 is a block diagram of an example content streaming system suitable for use in implementing some embodiments of the present disclosure.
Figure 6:
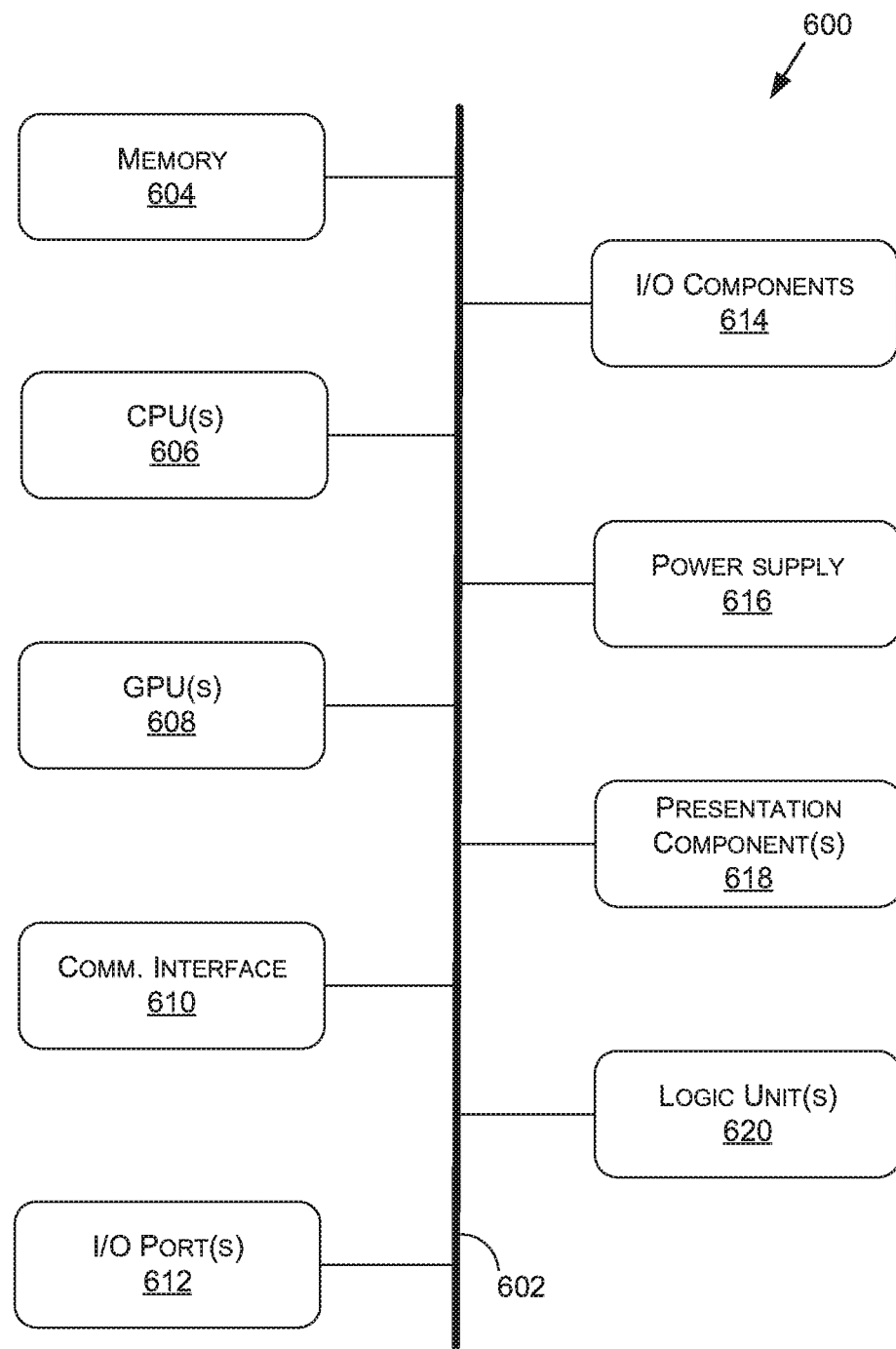
FIG. 6 is a block diagram of an example computing device suitable for use in implementing some embodiments of the present disclosure.

In some embodiments, components, features, and/or functionality of the system 100 may be similar to those of example game streaming system 500 of FIG. 5 and/or example computing device 600 of FIG. 6. For example, video montage generation may be executed within a cloud gaming environment, a cloud VR, AR, or MR environment, a remote desktop environment, and/or the like. In such examples, the video and/or audio streams may be rendered and/or generated remotely and streamed to client devices. Similarly, video montages may be generated remotely from the client devices and accessible—e.g., via stream or download—to the client devices. In other embodiments, the processes described with respect to a montage generation server(s) 102 may be executed using client device(s) 104, or a combination of the montage generation server(s) 102 and the client device(s) 104. In addition, in some examples, the montage generation server(s) 102 may be similar or the same servers that host the remote application (e.g., game servers 502 that host the cloud instance of a game), or may be separate servers. For example, the montage generation servers 102 may correspond to a same entity that hosts the games, or may correspond to a different entity that generates video montages.

The system 100 may include one or more montage generation servers 102 and/or one or more client devices 104 communicatively coupled to the montage generation server(s) 102 via network(s) 130. The network(s) 130 may include a wide area network (WAN) (e.g., the Internet, a public switched telephone network (PSTN), a cellular network, etc.), a local area network (LAN) (e.g., Wi-Fi, Bluetooth, Bluetooth Low Energy (BLE), Ethernet, etc.), and/or another network type, such as those described herein. In any example, each of the components of the system 100 may communicate with one or more of the other components via one or more of the network(s) 130.

The client devices 104 may include a smart phone, a laptop computer, a tablet computer, a desktop computer, a wearable device, a game console, a virtual reality (VR) or augmented reality (AR) system (e.g., a headset, a computer, a game console, remote(s), controller(s), and/or other components), a content streaming device (e.g., NVIDIA SHIELD), a smart-home device that may include an intelligent personal assistant, and/or another type of device capable of accessing the montage generation server(s) 102 and/or capable of executing one or more applications for generating video montages. The client devices 104 may include a game application 106, a display 108, a graphical user interface (GUI) 110, and/or an input device(s) 112. Although only a few components and/or features of the client device 104 are illustrated in FIG. 1, this is not intended to be limiting. For example, the client devices 104 may include additional or alternative components, such as those described below with respect to the computing device 600 of FIG. 6.

The game application 106 may be a mobile application, a computer application, a console application, and/or another type of application. The game application 106 may operate as a facilitator for enabling playing of a game associated with the game application on the client devices 104. Where the video montages are generated for video clips generated from sources other than video games, the game application 106 may instead correspond to the source of the video clips—e.g., a VR/AR/MR application, a social media application, a camera or video application, a photo or video storage application, and/or the like. Where the system 100 executes a cloud gaming environment, the game application 106 may correspond to an application that accesses an application programming interface (API) of a host server(s) (which may correspond to the montage generation server(s) 102, in embodiments) that executes a host application for game streaming—e.g., similar to that described herein with respect to FIG. 5.

The display 108 may include any type of display capable of displaying GUI 110 and/or display information generated using the game application 106 (or other application type) (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen is at least one of the input device(s) 112 of the client device 104.

The input device(s) 112 may include any type of devices that are capable of providing user inputs to the GUI 110, to the game application 106, to the montage generation system 100, etc. The input device(s) may include a keyboard, a mouse, a touch-screen display, a controller(s), a remote(s), a headset (e.g., sensors of a virtual reality headset, or head mounted display (HMD)), a microphone, and/or other types of input devices.

The GUI 110 may correspond to a GUI of a montage generation webpage, application, in-game (or in-application) overlay, and/or the like. For example, when a user desires to generate a video montage, the user may access the GUI 110 using the client device(s) 104 such that the user may view a library of videos or video clips, upload videos or video clips, select various user preferences (e.g., transition types, audio types, textual information, themes, styles, etc.) for the video montages, select recipes for the video montages, share video montages, edit videos to generate video clips, signal generation of a video montage, etc. In addition, the GUI 110 may allow the user to preview and/or edit a video montage before a final video montage is generated. In some embodiments, the user may access generated video montages using the GUI 110. Although described herein as a GUI, the GUI 110 may additionally or alternatively implement other user interfaces, such as command line interfaces, speech command interfaces, natural user interfaces (NUIs), and/or the like.

Figure 2:
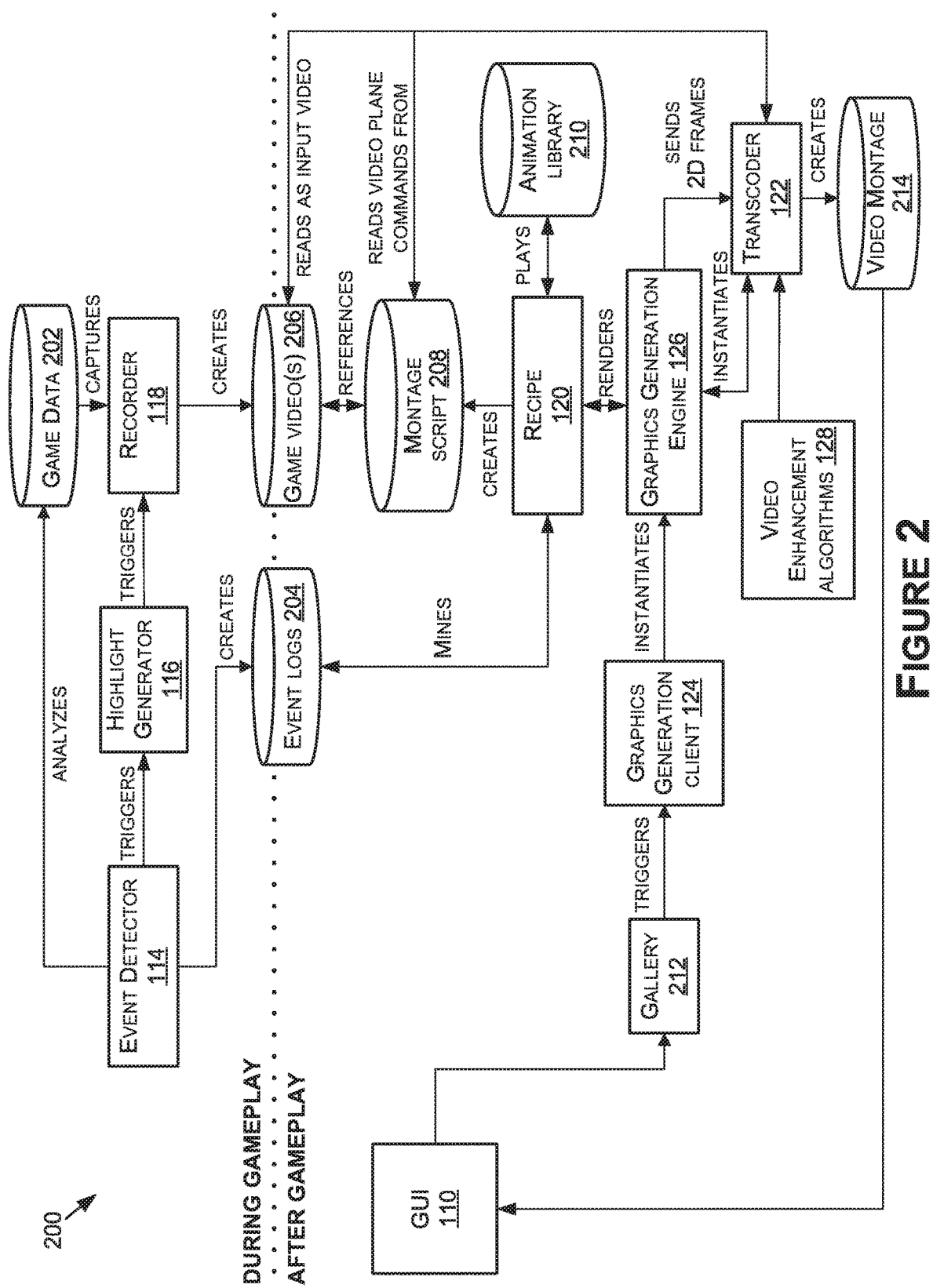
FIG. 2 depicts an example data flow diagram for generating a video montage, in accordance with embodiments of the present disclosure.

For example, and with reference to FIG. 2, a user may access the GUI 110 to view a gallery 212 of videos or video clips for which video montages may be generated from. The gallery 212 may include videos uploaded by the user, saved for and/or associated with the user—such as game videos 206—automatically via highlight generation, gameplay recordings triggered by the user, and/or the like. As such, the user may navigate (e.g., search, scroll through, etc.) the gallery 212 via the GUI 110, and may select one or more videos (e.g., from which video clips may be generated based on certain criteria, such as event types determined from event logs 204) and/or video clips (e.g., pre-generated video clips from larger portions of gameplay (e.g., using highlight generator 116 and recorder 118) and/or from larger video files. In some embodiments, instead of selecting video clips or videos from a gallery 212, the user may provide criteria for the system 100 to generate the video montages. For example, the user may indicate that the user wants a video montage of events (e.g., successful shots) in a specific FPS style game. The system 100 may then access game videos 206 and/or event logs 204 corresponding to larger videos to determine video clips corresponding to successful shots. These video clips may then be generated, or metadata defining the video clips (e.g., from time or frame X to time or frame Y of video Z) from a larger video may be used, to update a recipe (e.g., recipe 120) for generating a video montage 214.

In addition to selecting and/or providing criteria for the video clips, the user may also use the GUI 110 to select various styles, themes (e.g., fun, dark, dramatic, etc.), transition types (e.g., slide, ripple, fade in, fade out, etc.), animations, graphics, visual effects (e.g., slow motion, fast motion, shading, etc.), audio effects, background music, textual information, and/or the like for updating parameters of and/or data used by a recipe—e.g., where the particular recipe is parameterized. For example, a recipe may use data—where available—to generate montage scripts 208. As such, where the data includes text, a user-entered text may be used, where the data includes video clips or metadata corresponding thereto, the user-selected or system-mined video clips may be used, where the data includes graphics or animations, the user-selected graphics or animations may be used, and so on. Where the parameters include transition types, themes, effects, and/or the like, the user-selected transitions, themes, and/or effects may be used to update the parameters of the recipe. In examples where a user has not selected or indicated a preference for text, video clips, and/or the like, or the particular effect, transition, style, theme, etc. is not parameterized, the default or template information from the recipe may be used. As such, in some embodiments, a user may be able to select a certain recipe from a group of recipes (e.g., a FPS recipe, a specific FPS game recipe, a specific FPS game event recipe, a sports game recipe, a sports sepia tone recipe, a recipe for a particular platform (e.g., social media, video sharing platforms, etc.), and then may provide certain user preferences—if enabled for the particular selected recipe—to fine-tune the recipe. In any example, once the data is determined and the parameters are set, the recipe 120 may be executed by the graphics generation engine 126 to generate the montage script 208, as described in more detail herein, and to generate graphical overlay frames.

Referring again to FIG. 1, the montage generation server(s) 102 may include one or more of a server(s), network attached storage(s) (NAS), application programming interfaces (APIs), backend devices, and/or other device types. In some examples, the montage generation server(s) 102 may include one or more graphics processing units (GPUs) and/or virtual GPUs (vGPUs) for executing rendering by the graphics generation engine 126, the transcoder 122, the highlight generator 116, the video enhancement algorithms 128, and/or the like. The GPUs, vGPUs, and/or one or more parallel processing units may execute one or more of the processes described herein using parallel processing. For example, frames of the video montage 214—e.g., graphical overlay frames, video frames from the video clips, and/or composited frames combining the two—may be rendered and/or composited in parallel. In some embodiments, the processes described herein may be executed using one or more virtual machines (VMs). For example, the montage generation process of the montage generation server(s) 102 may be executed using one or more VMs. As another example, the client device(s) 104, when executing in a cloud environment, may use one or more VMs of the montage generation server(s) 102 (and/or the game server(s) 502 of FIG. 5) to host or execute the game session, render the display data streamed to the client device(s) 104 during the game session, etc.

The montage generation server(s) 102 may include an event detector 114, a highlight generator 116, a recorder 118, a recipe 120, a transcoder 122, a graphics generation client 124, a graphics generation engine 126, video enhancement algorithms 128, and/or additional or alternative components. In some embodiments, the event detector 114, the highlight generator 116, and/or the recorder 118 may be executed using a different server(s) than the montage generation server(s) 102. For example, these components may correspond to an event detection and/or highlight generation system(s), outputs from which may be used by the system 100 to generate video clips and/or mine videos, recorded gameplay, and/or live gameplay for events—and then generate video clips based thereon, in embodiments. For example, the event logs and/or game videos generated or defined—e.g., using metadata—by the event detector 114, the highlight generator 116, and/or the recorder 118 may be populated in the gallery 212 and selected by the user, and/or may be mined by the recipe 120 to select the video clips or portions of larger videos for referencing in the montage script 208.

With reference to FIG. 2, the event detector 114 may analyze game data 202 (e.g., live game data from live game sessions, pre-recorded game data from previously played game sessions, video of game sessions, etc.) to create event logs 204 corresponding to particular event types the event detector 114 is programmed or trained to detect and/or to trigger the highlight generator 116 to trigger the recorder 118 to generate a highlight (e.g., a game video(s) 206) from the game data. The event detector 114 may analyze metadata from the game data 202 to determine individual data or combinations of data that indicate particular events occurring. For example, metadata indicating a kill, death, achievement, weapon type, item type, goal, touchdown, score change, home run, player username, and/or other event or activity within a game session may be identified to create an event log and/or to trigger the highlight generator 116 to cause a highlight video to be generated. In some embodiments, certain inputs, frequency of inputs, and/or other input-related data from the game data 202 may be analyzed to determine an event is occurring—such as where an event is defined as a scene with lots of activity, action, movement, or other criteria that may correspond to increased frequency or types of inputs. The event detector 114, when generating the event log 204 and/or triggering the highlight generation, may associate with the event log 204 time stamps corresponding to the period of time that the event took place and/or may indicate to the highlight generator 116 the period of time that the highlight video should correspond to. In some embodiments, both a highlight may be generated and an event log 204 may be recorded.

The event detector 114, in some embodiments, may perform various functions such as identifying colors, patterns (e.g., via pattern analysis), symbols, text (e.g., via optical character recognition (OCR)), and/or other information from the game data 202 (e.g., from image data, using computer vision, etc.) to determine that events have taken place. For example, when a skull is detected, this may indicate a death in the game, which may trigger a highlight and/or generate an event log 204. As another example, text determined via OCR that indicates "Player A scored a goal" may indicate an event and the event detector 114 may trigger a highlight and/or generate an event log 204. In some embodiments, video represented by the game data 202, video uploaded by a user, stored videos from prior game sessions, etc. may be analyzed by the event detector 114 using machine learning models, neural networks, and/or other artificial intelligence techniques to identify events from the video or image data. For example, frames of the videos may be applied to a machine learning model, a neural network, and/or the like, and indicators of events and/or event type classifications may be output and used to trigger highlights and/or to generate event logs 204. As such, the event detector 114 may use one or more of a variety of detection techniques—alone or in combination—to identify events that take place in live gameplay, pre-recorded game play, game videos, user uploaded videos, and/or the like. The event logs 204 (e.g., which may be stored in JavaScript Object Notation (JSON) format) may include metadata corresponding to a type of event, a duration of the event, a start and start time within a particular video the event is captured, etc. In some embodiments, the event log may indicate a time, or a period of time of the event, and the recipe 120 may reference this time and then some additional period of time (e.g., 5 seconds, 10 seconds, 20 seconds) prior to and/or after the time that may be used to generate a game video 206 corresponding to an entire event.

A detected event may cause the event detector 114 to trigger the highlight generator 116, in some embodiments. For example, the event detector 114 may indicate to the highlight generator 116 that a highlight should be generated from a live game, a pre-recorded game, an uploaded or stored video, etc. The event detector may indicate a beginning time, an ending time, a period of time, and/or may otherwise indicate the portion of the live game, pre-recorded game, uploaded or stored video, etc. that should be included in the highlight. In some embodiments, in addition to the highlight generator 116, certain effect may be added to the highlights by the highlight generator 116, such as slow motion, fast motion, time lapse, and/or the like.

The highlight generator 116 may also trigger the recorder 118 to generate the recordings of a specific event from more than one viewpoint or perspective. For example, the highlight generator 116 may trigger the capture of the highlight from an in-game perspective of the user, an in-game perspective of another user in a similar portion of the environment or directly involved in the event (e.g., where an avatar of a user takes out another avatar of another user, the in-game perspective of the taken out user may also be recorded), a real-world camera view of the user and/or another user (e.g., via web cam), and/or the like. As such, the highlight may be recorded by the recorder 118 as one or more videos from one or more perspectives. In some embodiments, as described herein, additional perspectives may be used to generate picture-in-picture composited frames for the video montage 214.

The recorder 118 may receive commands from the highlight generator 116 to record, capture, clip, and/or perform other actions to generate the game videos 206 (or highlights) from the game data 202 and/or from image or video data uploaded by a user and/or previously generated and stored by the system 100. As such, the recorder 118 may generate the game videos 206 that may later be referenced by the recipe 120 and the montage script, and included, at least in part, in the video montage 214 (e.g., as background video frames composited with graphical overlay frames generated by the graphics generation engine 126).

As described herein, the user may access the GUI 110 (e.g., a user generated content (UGC) user interface (UI)) to trigger the generation of a video montage 214. The user may have no history or indications of preferences or selections, in some embodiments, such that the generation of the video montage 214 may be performed completely automatically— e.g., by mining event logs and/or selecting game videos 206, and adhering to a template of a recipe with no modifications to parameters. In other examples, the user may have preferences or selections, such as to which type of game, which game, which types of events within the game(s), specific events within a game(s), etc., and/or may have preferences for particular previously generated game videos 206 or highlights (from the gallery 212), or a combination thereof. In addition to the events and/or game videos 206, the user may also select animations, graphics, text, music, audio effects, transitions, styles, themes, shaders, and/or other data sources or parameter preferences for the recipe. In addition, in some embodiments, the user may be able to select a recipe template from a recipe gallery or store, such as a recipe for a particular type or style of game, a particular game, a particular type of events within a game(s), a particular theme or style, a particular sharing platform (e.g., social media, video sharing platforms, video game clip or video sharing platforms), etc. For example, the user may be able to view previews or examples of video montages 214 generated using particular recipes, and may select the recipe the user prefers. Once selected, the user may be given one or more options for transitions, styles, audio, graphics, etc. that may be used to update the recipe parameters (where parameterized) and/or to update the data source references (e.g., videos, events, audio, music, graphics, animations, etc.) of the recipe 120.

The video montage generation process may be triggered once the data sources and/or the user preferences are known. For example, a graphics generation client 124 (e.g., a CEF client) may instantiate a graphics generation engine 126. In some embodiments, the graphics generation client 124 may correspond to an embedded browser client, and the embedded browser client (e.g., executing a .exe file) may instantiate a graphics generation engine of the embedded browser. The graphics generation engine 126 may instantiate the transcoder 122, in embodiments, to begin communicating with the graphics generation engine 126 and/or the video enhancement algorithms 128 to generate the video montage 214 according to the montage script 208, as described herein.

The video montage generation process may include the graphics generation engine 126 executing the determined (or selected) recipe 120 after (where applicable) updating parameters of the recipe 120 and data references (e.g., for game videos 206, events corresponding to videos, animations or graphics from animation library 210, music, audio effects, etc.) for the recipe 120. The recipe 120 may thus specify an introduction, a conclusion or closing sequence, transitions, edge logs or event logs, videos or clips therefrom, etc. In some embodiments, as described herein, the video clips may be mined using the recipe 120 according to the event logs 204. In such examples, the recipe 120 may indicate which video to reference for the transcoder 122 and the portion thereof corresponding to the event. In some non-limiting examples, the recipe 120 may be scripted using JavaScript, and the JavaScript code may be executed using a hypertext markup language (HTML) application. As such, the graphics generation engine 126 may execute the recipe 120 to generate the montage script 208. The montage script 208 may, in some non-limiting examples, be generated using a JSON format.

The transcoder 122 may read video plane commands— e.g., for retrieving and/or editing the video frames from the game videos 206—from the montage script 208. The transcoder 122 may execute using a dynamic link library (DLL) file format, in some embodiments. The recipe 120 may further be referenced or executed by the graphics generation engine 126 to generate the graphical overlay frames according to the recipe 120. For example, as the graphics generation engine 126 generates, frame by frame, the graphical overlay frames according to script and animation sequences, the graphics generation engine 126 may send commands to the transcoder 122 indicating a particular frame has been rendered, and the transcoder 122 may use the graphical overlay frame and a video frame—where applicable—from a video clip to render or composite the final frame for the video montage 214. This compositing process may be executed by the transcoder 122 according to the montage script 208 that was generated by the graphics generation engine 126 when executing of the recipe 120. For example, the graphics generation engine 126 (e.g., an embedded browser) may perform a first pass of the recipe 120 to generate the montage script 208, which may be used by the transcoder 122 to generate or retrieve the video frames, and the graphics generation engine 126 may render the graphical overlay frames based on a second pass of the recipe 120.

For example, the montage script 208 may include information such as, without limitation, the first two seconds of frames include only graphical overlay frames and no video frames, next five seconds of frames include the first five seconds of frames of video clip A, each overlaid with graphical overlay frames (although one or more of the graphical overlay frames may include fully transparent alpha values, or no graphical overlay frames may be generated and the transcoder 122 may ignore any data from the graphics generation engine 126), the next five seconds of frames includes graphical overlay frames only, and so on. In some embodiments, as described herein, each frame of the video montage 214 may be generated with a graphical overlay frame, but the graphical overlay frame may be fully transparent in some embodiments such that a video frame from a game video 206 (or other video source) may directly correspond to the frame of the video montage 214. For example, the graphics generation engine 126 may render the graphical overlay frames in RGBA format, such that the transparency or alpha information may be used to determine which portion of the 2D graphical overlay frame is visible in the final frame of the video montage 214.

The montage script—or the timeline defined thereby—may be followed by the transcoder 122 to retrieve the video frames, where applicable, and to composite the graphical overlay frames with the received graphical overlay frames from the graphics generation engine 126. As such, for each time step or frame, the graphics generation engine 126 may reference the recipe to determine what graphics, effects, transitions, animations (e.g., referencing the animation library 210), text, and/or other data to render in the graphical overlay frame. The graphics generation engine 126 may, in some non-limiting embodiments, correspond to a browser engine and a browser library, which may include a JavaScript virtual machine (VM) that may interpret HTML, cascading style sheets (CSS), and/or scalable vector graphics (SVG) to create graphical rendered displays/pages (e.g., the graphical overlay frames). Once rendered, the graphical overlay frame may be transmitted to the transcoder 122 (e.g., via a command through an extension API, for example), and the transcoder 122 may composite—where a video frame is available at the given time step—the frames (e.g., audio frames and video frames) of the video montage 214 according to the montage script 208 instructions for the particular frame. The command to the transcoder 122 from the graphics generation engine 126 may include information such as the location in system memory or a texture in hardware memory of the graphical overlay frame, for example. The video frame used for compositing with the graphical overlay frame may be rendered prior to compositing by the transcoder 122, such as where picture-in-picture, effects, upscaling, etc. are to be applied to the video frame. For example, the transcoder 122 may use a frame from a first video clip, composite with a picture-in-picture portion of a second video clip (e.g., corresponding to the same event from a different perspective), and/or may add one or more effects—e.g., upscaling, a tone, an effect, etc.—to generate an updated or final video frame for combination or compositing with a graphical overlay frame. This process may continue, frame by frame, until the video montage 214 has been created.

The transcoder 122 may synchronize audio data with the video portions of the video montage 214. For example, the transcoder 122 may match the audio with the video, implement cross fades, curves for cross fades, and/or otherwise edit the audio to generate the audio. As described herein, audio data may correspond to background music, gameplay sounds, and/or audio effects.

In some embodiments, as described herein, the transcoder 122 may use video enhancement algorithms 128 to generate the video frames for compositing and/or to generate the composited frames from the video frames and the graphical overlay frames. For example, a shader library may be accessed to add color effects, such as sepia, for transitions, effects at certain time stamps, effects for an entire video, etc. The shaders may be used, for example, to generate a ripple effect or other transition effects. For example, an artificial intelligence model(s) may process the video frames, the graphical overlay frames, or the combination thereof to generate various effects for the video montage.

Resolution scaling—e.g., upscaling—may be executed to upscale frames (e.g., video frames from video clips) from a captured resolution to a desired resolution for the video montage 214. For example, where different video clips have different resolution, but the output resolution for the video montage 214 is greater than a resolution of any of the video clips, upscaling may be executed to match the video montage 214 resolution. Upscaling may be executed using one or more machine learning models or neural networks.

Speed effects may be added to the video montages 214 using the video enhancement algorithms 128, in some embodiments. For example, slow motion or enhanced speed may be used. In a slow motion example, the speed of playback may be reduced by half. As such, where the video montage 214 is generated at 30 fps, the video enhancement algorithms 128 may be used to generate additional frames between the 30 fps such that 60 frames are generated to play the same sequence of events at half the speed. To do this, an interpolator may be executed to render a frame between each existing pair of frames by comparing a previous frame to a next frame and extrapolating what a compatible middle frame may look like. In some embodiments, the interpolator may include one or more machine learning models and/or neural networks.

Another example of a video enhancement algorithm 128 is a style transfer tool. For example, where a particular image has an effect or style, the effect or style of an image may be learned using an AI algorithm, and the style learned from the image may be applied to frames of the video montage 214. For example, where an image including a night sky effect is used, the AI algorithm may learn the image, and the night sky style learned from the image may be applied frame by frame to the video montage 214.

In some examples, such as where a video clip corresponds to a web cam or other recorded footage of a user, an AI green screen tool may be executed to generate a virtual background for the user in order to maintain privacy of the user's home or location during the recording.

In some embodiments, such as where the graphics generation engine 126 corresponds to a 2D graphics generation engine of an embedded browser (e.g., using a chromium embedded framework (CEF)), the process 200 may enable the graphics generation engine to render at a rendering rate that is faster than the graphics generation engine 126 is traditionally programmed for. For example, because the graphics rendering engine may render at a rate that is prompted by the transcoder 122 (which is capable of executing at 200 fps or more), the rendering rate may be increased beyond real-time rendering (e.g., where 60 fps is a real-time rendering rate, the rendering rate may be greater than 60 fps). This may be a result of the rendering taking place in lockstep frame by frame with the transcoder 122. For example, where the graphics generation engine 126 would normally proceed to a next frame at the real-time frame rate automatically once finished with rendering a previous frame, the graphics generation engine 126 of the system 100 may proceed to the next frame faster than normal in response to the command from the transcoder 122 to move to the next frame (or to a particular frame).

In some examples, the video montage generation process may include generating a preview for the user to view, interact with, and/or edit. For example, once a recipe, parameters, data sources, and/or other information for the video montage 214 are selected, the video preview may be generated for the user and displayed with the GUI 110. The user may then edit the montage by moving things around (e.g., moving clips around, moving animations, changing transitions, moving background music, changing text, etc.).

Figure 3:
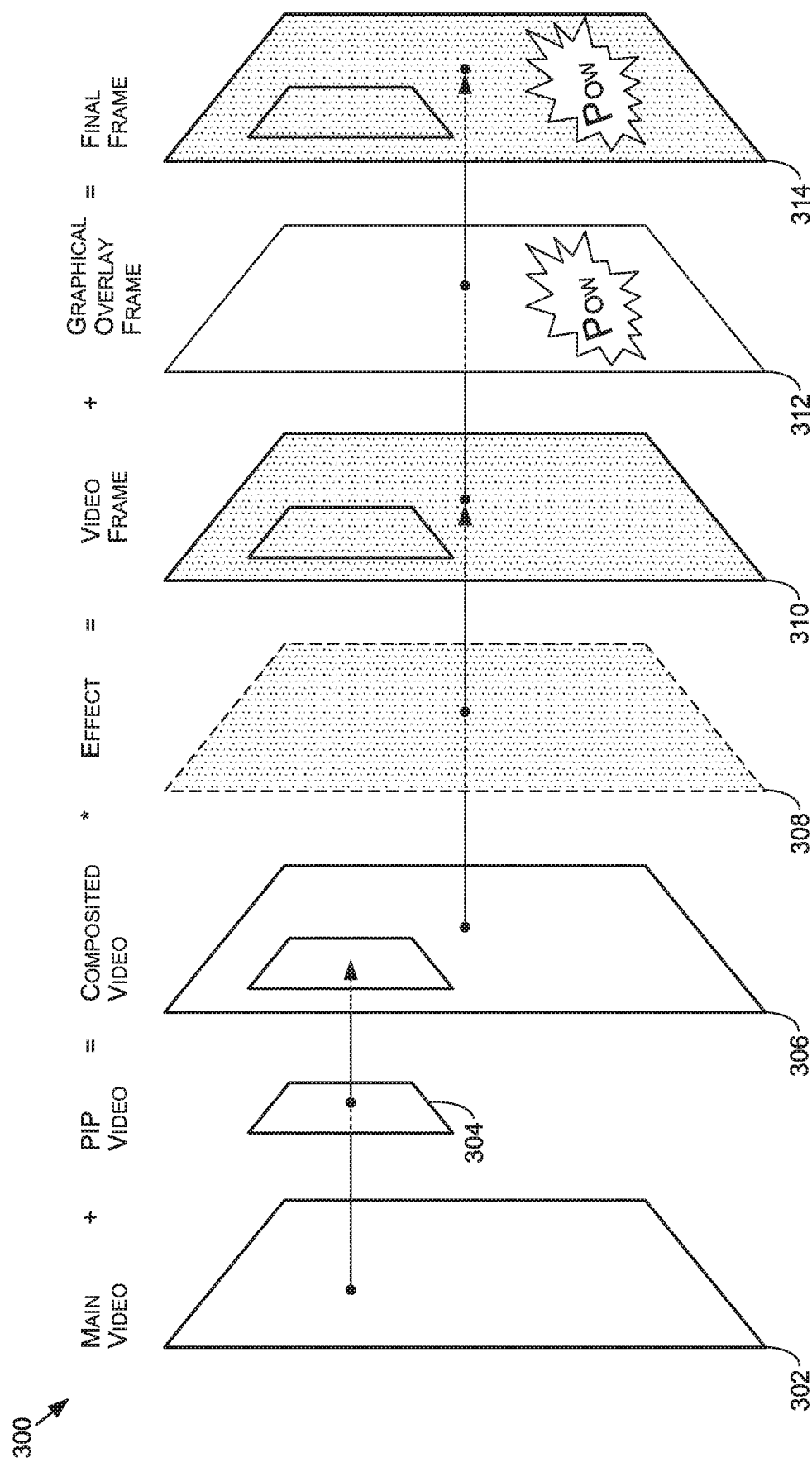
FIG. 3 depicts an example process for generating a final frame of a video montage from two or more sub-frames, in accordance with embodiments of the present disclosure.

With reference to FIG. 3, FIG. 3 depicts an example process 300 for generating a montage frame of a video montage from two or more sub-frames, in accordance with embodiments of the present disclosure. The example of FIG. 3 corresponds to a final frame 314 (e.g., a montage frame) composited from both a graphical overlay frame 312 and a video frame 310. However, as described herein, in some embodiments there may be no video frame 310 or no graphical overlay frame (or there may be a graphical overlay frame with full transparency). In the process 300, the transcoder 122 may retrieve main video frame 302 from a video clip according to the timeline and/or the montage script 208. The transcoder 122 may also retrieve another video clip for picture-in-picture (PIP) video frame 304, and then may generate composited frame 306 using the main video frame 302 and the PIP video frame 304. In some embodiments, the transcoder may apply an effect 308—e.g., using the video enhancement algorithms 128—to generate the video frame 310. As described herein, in some embodiments, the generation of the video frame 310 may have been executed in response to a command from the graphics generation engine 126 indicating that the graphical overlay frame 312 has been rendered and transmitted and/or stored. The transcoder 122 may composite—e.g., using alpha compositing—encode, and/or otherwise combine the video frame 310 and the graphical overlay frame 312 to generate the final frame 314 (e.g., a frame for inclusion in the montage).

Referring again to FIG. 2, once the video montage 214 is generated, the video montage 214 may be made available using the GUI 110. For example, the user may view or preview the video montage 214 on the display 108, download or store the video montage 214, share the video montage 214 via one or more platforms or via text, SMS, email, etc. In some embodiments, the user may have triggered generation of the video montage 214 within an in-game overlay (IGO) of a game such that the video montage 214 may be automatically generated substantially simultaneously with game play. For example, a user may trigger generation of a video montage for a particular game prior to or during playing, and may select hot keys indicating events the user wants recorded—or the system may automatically mine for events to record, such as based on user preferences for event types or montage style or theme—and the game videos 206 may be recorded and used to generate the video montage 214 corresponding to the game session. As a result, when a user completes the game session, the user may share the automatically generated video montage 214, thereby drastically reducing the video montage generation time as compared to traditional approaches.

Figure 4:
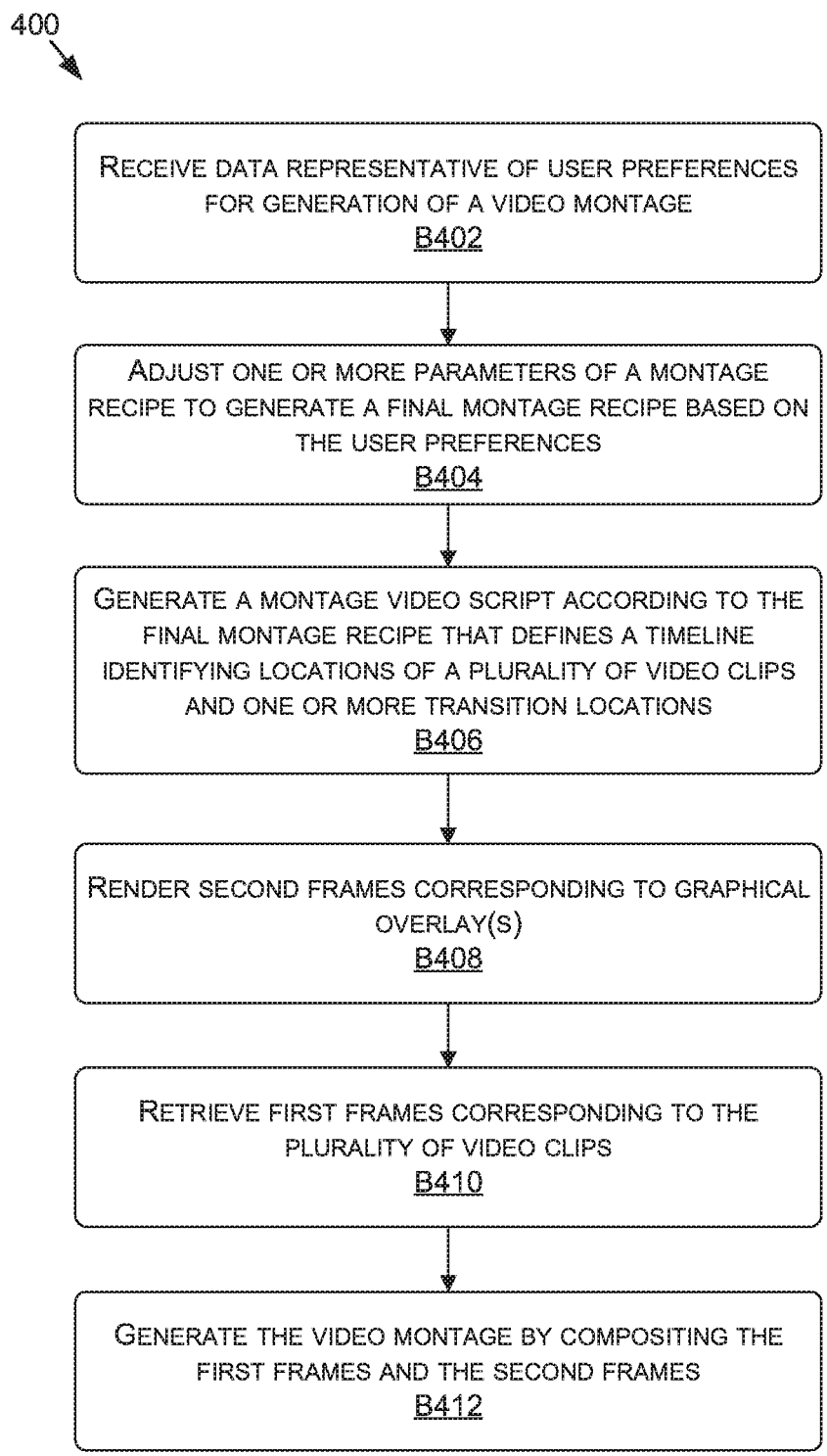
FIG. 4 depicts an example flow diagram for a method of automatic video montage generation, in accordance with embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the system 100 of FIG. 1 and the process 200 of FIG. 2. However, this method may additionally or alternatively be executed by any one system and/or within any one process, or any combination of systems and processes, including, but not limited to, those described herein.

FIG. 4 is a flow diagram showing a method 400 for a method of automatic video montage generation, in accordance with embodiments of the present disclosure. The method 400, at block B402, includes receiving data representative of user preferences for generation of a video montage. For example, the recipe 120 may receive data representative of user preferences for the video montage 214. The user preferences may include the video clips that should be included, transition types, background music, audio effects, graphical effects, animations or graphics, themes, styles, textual information, and/or the like.

The method 400, at block B404, includes adjusting one or more parameters of a montage recipe to generate a final montage recipe based on the user preferences. For example, a recipe 120 may be parameterized, and one or more parameters of the recipe 120 may be updated based on the user preferences to generate the updated or final version of the recipe 120. For example, the types of transitions, theme, style, etc. may be updated. In addition to parameters, the selection of video clips, music, text, and/or other data may be referenced in the recipe 120, and used by the graphics generation engine 126 to generate the montage script 208 (e.g., the montage script 208 may reference which clips to use, what portions of the clips to use, what music to use, at what portions the music should play, etc.). In addition, the updates to the recipe 120 may be used by the graphics generation engine 126 to determine which transitions to use for each transition, textual information such as introductions, conclusions or closing sequences, scene segues, etc., graphics or animations, etc. for rendering the graphical overlay frames.

The method 400, at block B406, includes generating a montage script according to the final montage recipe that defines a timeline identifying locations of a plurality of video clips and one or more transition locations. For example, the recipe 120 may be executed by the graphics generation engine 126 to generate the montage script that includes code that the transcoder may read video plane commands from. In addition, the graphics generation engine 126 may render graphical overlay frames based on the recipe 120. As such, the montage recipe 120 may include code that is used to generate the code of the montage script, and the montage script may be used by the transcoder—which may be instantiated by the graphics generation engine 126 based on commands—to generate the montage frames of the video montage 214.

The method 400, at block B408, includes rendering second frames corresponding to graphical overlays. For example, the graphics generation engine 126 may render the graphical overlay frames according to graphics, text, animations, transitions, and/or other graphical information as defined by the montage recipe 120. In some embodiments, as described herein, the rendering of the graphical overlay frames may be executed in lockstep with the transcoder 122. As such, for a first frame of the video montage 214, the transcoder may determine that a video frame from the video clips (e.g., the game videos 206) and/or a graphical overlay frame is required per the montage script 208. As such, the transcoder may retrieve the video frame based on a command from the graphics generation engine 126 that a corresponding graphical overlay frame for the given time step has been rendered. As a result, where the graphics generation engine 126 corresponds to a 2D vector graphics generation engine of an embedded browser, the graphics generation engine 126 may render frames at a rate that is faster than traditionally programmed, as described herein. In some embodiments, for a particular frame of the video montage 214, there may be no video frame or no graphical overlay frame (or a fully transparent frame). At such time steps, the particular frame may correspond only to the video frame or only to the graphical overlay frame. In embodiments where no graphical overlay frame is required, the graphics generation engine 126 may still render a graphical overlay frame, but transparency or alpha values of the frame may all correspond to full transparency.

The method 400, at block B410, includes retrieving first frames corresponding to the plurality of video clips. For example, the transcoder 122 may, frame by frame, in embodiments, retrieve video frames corresponding to the video clips according to the timeline defined by the montage script. Where a frame of the video montage 214 does not correspond to a video frame of a video clip, the only information used may be the graphical overlay frames rendered by the graphics generation engine 126.

The method 400, at block B412, includes generating the video montage by compositing the first frames and the second frames. For example, the transcoder may composite—e.g., via alpha compositing—encode, or otherwise combine each graphical overlay frame with its corresponding video frame (for frames where both are present) to generate the montage frames of the video montage 214.

Example Content Streaming System

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented. The application session may correspond to a game streaming application (e.g., NVIDIA GeFORCE NOW), a remote desktop application, a simulation application (e.g., autonomous or semi-autonomous vehicle simulation), computer aided design (CAD) applications, virtual reality (VR) and/or augmented reality (AR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the game server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, etc.), and output the data (e.g., as an image, video, sound, etc.).

Example Data Center

Figure 7:
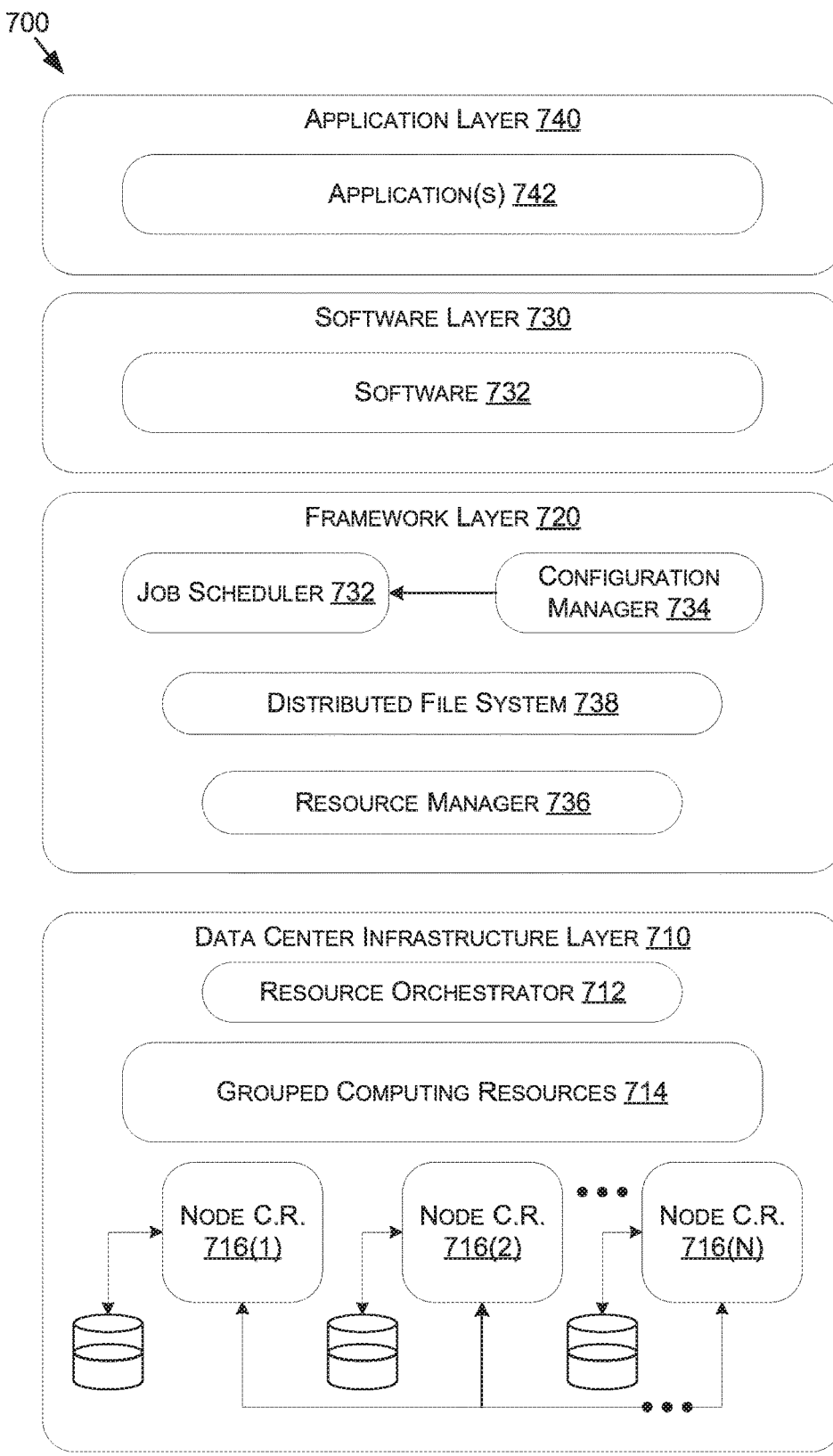
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors or graphics processing units (GPUs), etc.), memory devices (e.g., dynamic read-only memory), storage devices (e.g., solid state or disk drives), network input/output ("NW I/O") devices, network switches, virtual machines ("VMs"), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, and/or other processors may be grouped within one or more racks to provide compute resources to support one or more workloads. The one or more racks may also include any number of power modules, cooling modules, and/or network switches, in any combination.

The resource orchestrator 722 may configure or otherwise control one or more node C.R.s 716(1)-716(N) and/or grouped computing resources 714. In at least one embodiment, resource orchestrator 722 may include a software design infrastructure ("SDI") management entity for the data center 700. The resource orchestrator 722 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 1036 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   instantiating a graphics generation engine using an executable program of an embedded browser client;
   generating, using the graphics generation engine and based at least on a montage recipe, a video montage script defining a timeline for a video montage that includes at least a first video clip, a second video clip, and one or more graphical elements; and
   generating the video montage, the generating including, for at least one montage frame of the video montage:
      generating, using the graphics generation engine and based at least in part on the montage recipe, at least one graphical overlay frame including at least one graphical element of the one or more graphical elements and corresponding to a time on the timeline;
      retrieving, using a transcoder and according to the video montage script, a video frame from the first video clip corresponding to the time, the transcoder being instantiated using the graphics generation engine; and
      compositing, using the transcoder and according to the video montage script, the at least one graphical overlay frame and the video frame to generate the at least one montage frame corresponding to the time.

2. The method of claim 1, wherein, for any montage frames of the at least one montage frame that have no corresponding video frames from the first video clip or the second video clip, the montage frames correspond to the at least one graphical overlay frame generated by the graphics generation engine.

3. The method of claim 1, wherein, for any montage frames of the video montage that have no corresponding graphical overlay frame or a fully transparent graphical overlay frame, the montage frames correspond to the video clip frames of at least one of the first video clip or the second video clip.

4. The method of claim 1, further comprising: compositing, using the transcoder, another video frame with the video frame as a picture-in-picture to generate a picture-in-picture composite frame, wherein the compositing the at least one graphical overlay frame and the video frame includes compositing the at least one graphical overlay frame and the picture-in-picture composite frame.

5. The method of claim 1, wherein each video frame of the video montage is generated using a corresponding graphical overlay frame, the compositing is in red green blue alpha (RGBA) format, and the frames of the video montage that do not include a corresponding graphical element include the corresponding graphical overlay frames with fully transparent alpha values.

6. The method of claim 1, wherein the retrieving the video frame is based at least in part on a command from the graphics generation engine indicating that the graphical overlay frame has been rendered.

7. The method of claim 1, wherein the graphics generation engine is executed using an embedded browser and the graphics generation engine corresponds to a two-dimensional (2D) vector graphics generation engine.

8. The method of claim 1, wherein a rendering dock of the graphics generation engine is advanced at a rate corresponding to capabilities of the transcoder.

9. The method of claim 1, wherein the montage recipe is represented using code, the graphics generation engine executes a first pass of the code using a hypertext markup language (HTML) application to generate the video montage script, and the graphics generation engine executes a second pass of the code using the HTML application to generate the at least one graphical overlay frame.

10. The method of claim 1, wherein the compositing is based at least in part on the transcoder selecting the at least one graphical overlay frame and the video frame according to the timeline.

11. The method of claim 1, further comprising determining the montage recipe based at least in part on a game application or a type of game application that the first video clip and the second video clip correspond to.

12. The method of claim 1, further comprising:
receiving input data representative of one or more selections of one or more preferences corresponding to the video montage; and
updating one or more parameters of the montage recipe based at least in part on the one or more preferences.

13. The method of claim 1, wherein the first video clip and the second video clip correspond to segments of a single video.

14. The method of claim 1, further comprising:
mining event logs generated based at least in part on an analysis of application data corresponding to one or more sessions of an application;
determining a first event and a second event based at least in part on the mining; and
retrieving or generating the first video clip corresponding to the first event and the second video clip corresponding to the second event,
wherein the receiving the video data is based at least in part on the retrieving or the generating the first video clip corresponding to the first event and the second video clip corresponding to the second event.

15. A system comprising:
one or more processors;
one or more memory devices storing instructions that, when executed using the one or more processors, cause the one or more processors to execute operations comprising:
receiving data representative of one or more user preferences for generation of a video montage;
based at least in part on the one or more user preferences, adjusting one or more parameters of a template montage recipe to generate a final montage recipe;
instantiating a graphics generation engine using an executable program of an embedded browser client;
generating, using the graphics generation engine and using the final montage recipe, a video montage script according to the final montage recipe, the video montage script defining a timeline for the video montage that identifies first locations along the timeline for a plurality of video clips and second locations along the timeline for one or more graphical overlays;
rendering, using the graphics generation engine and using the final montage recipe, one or more first frames corresponding to the one or more graphical overlays;
retrieving, using a transcoder and according to the video montage script, one or more second frames corresponding to the plurality of video clips, the transcoder being instantiated using the graphics generation engine; and
generating, using the transcoder and according to the video montage script, the video montage such that, for a first frame of the one or more first frames and a second frame of the one or more second frames that correspond to a same time on the timeline, a composite frame is generated from the first frame and the second frame.

16. The system of claim 15, wherein the user preferences correspond to at least one of a selection of at least one of the plurality of video clips, an indication of one or more segments of a larger video that correspond to at least one of the plurality of video clips, a selection of at least one transition type between video clips of the plurality of video clips, an audio selection, a graphics selection, a text selection, an effect selection, or a theme selection for the video montage.

17. The system of claim 15, wherein the operations further comprise:
generating a visual preview of the video montage;
receiving input data representative of one or more adjustments to the video preview; and
updating the final montage recipe based at least in part on the one or more adjustments.

18. The system of claim 15, wherein the retrieving the one or more second frames includes, for each second frame of the one or more second frames, receiving an indication to proceed to a time step corresponding to the first frame from the graphics generation engine.

19. A method comprising:
generating event logs corresponding to an event type based at least in part on an analysis of game data from one or more game sessions of a game;
based at least in part on the event logs, determining video clips corresponding to a plurality of events;
generating a montage recipe based at least in part on the video clips;
instantiating a graphics generation engine using an executable program of an embedded browser client;
generating, using the graphics generation engine and based at least in part on the montage recipe, a video montage script referencing the video clips;
rendering, using the graphics generation engine and based at least in part on the montage recipe, one or more graphical overlay frames;
instantiating, using the graphics generation engine, a transcoder; and
generating, using the transcoder and based at least in part on the video montage script, a video montage based at least in part on compositing the one or more graphical overlay frames with video frames from the video clips to generate final frames.

20. The method of claim 19, wherein the graphics generation engine is executed using an embedded browser, the graphics generation engine corresponds to a two-dimensional (2D) vector graphics generation engine, the graphics generation engine is instantiated using the executable program of an embedded browser client, and the transcoder is instantiated using the graphics generation engine.

* * * * *